(12) United States Patent
Song et al.

(10) Patent No.: US 9,112,670 B2
(45) Date of Patent: Aug. 18, 2015

(54) METHOD AND APPARATUS FOR DYNAMIC RESOURCE ALLOCATION

(71) Applicant: Electronics and Telecommunications Research Institute, Daejeon (KR)

(72) Inventors: Jae Su Song, Daejeon (KR); Seok Seo, Daejeon (KR); Yunhee Cho, Daejeon (KR); Seung-Hwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 63 days.

(21) Appl. No.: 14/086,571

(22) Filed: Nov. 21, 2013

(65) Prior Publication Data

US 2014/0162678 A1   Jun. 12, 2014

(51) Int. Cl.
*H04L 5/00* (2006.01)
*H04B 17/345* (2015.01)

(52) U.S. Cl.
CPC .............. *H04L 5/0073* (2013.01); *H04L 5/006* (2013.01); *H04L 5/0069* (2013.01); *H04B 17/345* (2013.01); *H04L 5/0037* (2013.01); *H04L 5/0044* (2013.01); *H04L 5/0076* (2013.01)

(58) Field of Classification Search
CPC .. H04W 52/243; H04W 72/02; H04W 52/241

USPC ......... 455/452.1, 452.2, 9, 515, 67.11, 67.13, 455/553.1

See application file for complete search history.

(56) References Cited

U.S. PATENT DOCUMENTS

| | | | |
|---|---|---|---|
| 2008/0233967 | A1* | 9/2008 | Montojo et al. ............ 455/452.2 |
| 2010/0105406 | A1 | 4/2010 | Luo et al. |
| 2011/0151881 | A1 | 6/2011 | Chou et al. |
| 2011/0235598 | A1* | 9/2011 | Hilborn ......................... 370/329 |
| 2015/0000505 | A1* | 1/2015 | Penttinen et al. ............... 84/609 |

FOREIGN PATENT DOCUMENTS

KR   10-2009-0084916 A   8/2009

* cited by examiner

*Primary Examiner* — Cong Tran
(74) *Attorney, Agent, or Firm* — Rabin & Berdo, P.C.

(57) ABSTRACT

A dynamic resource allocating apparatus of a first base station managing a first cell in a cellular communication system calculates an interference metric of each user terminal received by each user terminal from a plurality of neighboring cells, calculates a coupling factor between the first base station and each neighboring base station of each neighboring cell by using the interference metric and a load of each user terminal, calculates available cell boundary resources of neighboring cells by using the coupling factor with respect to each neighboring base station, and allocates resources by using the cell boundary resources allocated to the first cell and the available cell boundary resources of the neighboring cells.

17 Claims, 10 Drawing Sheets

FIG. 6
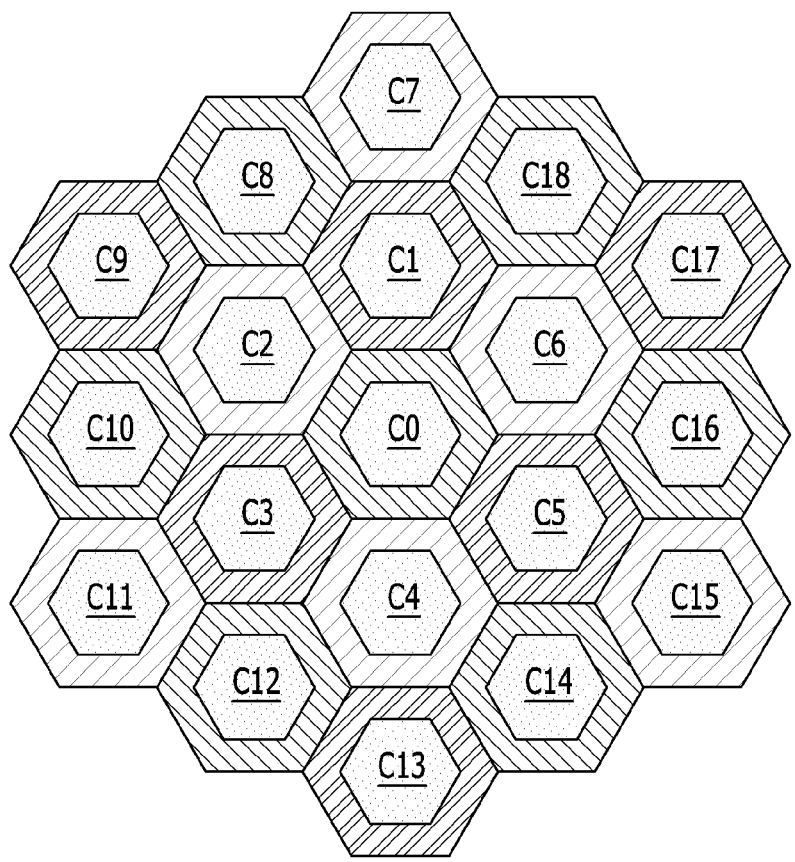
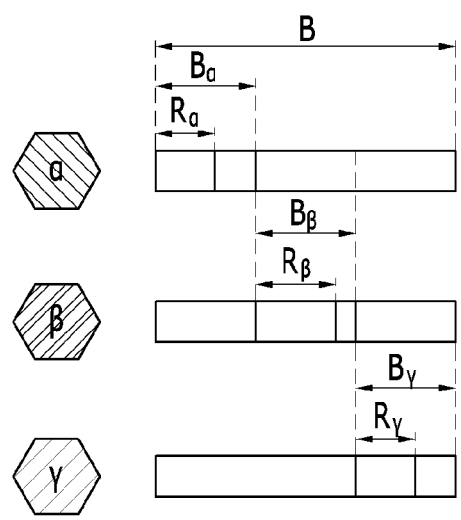

METHOD AND APPARATUS FOR DYNAMIC RESOURCE ALLOCATION

CROSS-REFERENCE TO RELATED APPLICATION

This application claims priority to and the benefit of Korean Patent Application No. 10-2012-0143861 filed in the Korean Intellectual Property Office on Dec. 11, 2012, the entire contents of which are incorporated herein by reference.

BACKGROUND OF THE INVENTION (a) Field of the Invention

The present invention relates to a dynamic resource allocating apparatus and method, and more particularly, to a dynamic resource allocating method and apparatus capable of canceling inter-cell noise in a cellular communication system.

(b) Description of the Related Art

In general, in a wireless communication system, the entire service area is divided into a plurality of cells to constitute multiple cells in order to increase system capacity. A base station (BS) is installed in each cell to provide a service to a terminal located within the cell.

In such a cellular system, in order to increase system capacity, frequency usage efficiency is required to be maximized, and to this end, each cell is designed to commonly use the entire frequency band. Thus, in the case in which neighboring cells commonly use the same frequency band, subchannels including an orthogonal frequency are allocated by users within one cell, causing no interference, but interference occurs between cells. This is known as inter-cell interference.

In particular, in case of a terminal located in a central area of a cell, strength of a signal received from a different cell is weak and a signal received from a serving cell is strong, inter-cell interference is not problematic, but in case of a terminal located in a boundary area of a cell, strength of a signal received from a neighboring cell is strong and a signal received from a serving cell is weak, having a low reception signal-to-noise ratio (SNR), which results in significant degradation of communication performance.

Thus, in order to solve the problem, a fractional frequency reuse (FFR) scheme has been proposed.

The FFR scheme is a scheme in which resource allocation for canceling inter-cell interference is performed in a frequency domain, and in addition, a fractional time reuse (FTR) scheme in which resource allocation is performed in a time domain has also been proposed.

According to the FFR scheme, a frequency domain is divided in a radio resource structure defined by two dimensional domains of time and frequency to cancel inter-cell interference. Further, the FTR scheme, relative to the FFR scheme, is a scheme in which a time domain is divided and a resource is allocated to a neighboring cell, thus canceling inter-cell interference.

Even in the FTR scheme, various methods used in the FFR scheme may also be used in the same manner.

However, having a configuration in which allocated resources are fixed, such a resource allocation scheme has difficulty in coping with a change in a load distribution within a cell or between cells.

Namely, if user load distributions in cells are even, there is no problem, but when user load distributions in cells are not even, one cell may be short of a resource, while the others may have remaining resources because the resources are not in use. Also, even within a cell, when load distributions in the center of the cell and the boundary thereof are not even, allocated resources may not be used or resources may be insufficient, which may result in failure of providing a service properly.

SUMMARY OF THE INVENTION

The present invention has been made in an effort to provide a method and apparatus for dynamically allocating resources having advantages of canceling inter-cell interference and enhancing resource usage efficiency by adaptively performing inter-cell resource allocation.

An exemplary embodiment of the present invention provides a method for allocating resources by a dynamic resource allocating apparatus of a first base station that manages a first cell in a cellular communication system including the first cell and a plurality of neighboring cells adjacent to the first cell. The dynamic resource allocating method may include: calculating an interference metric of each user terminal interfered with by the plurality of neighboring cells by each user terminal belonging to the first cell; calculating a coupling factor (CF) between the first base station and each neighboring base station of each neighboring cell by using the interference metric of each user terminal and a load of each user terminal; calculating available cell boundary resources of neighboring cells by using the coupling factor with respect to each neighboring base station; and performing resource allocation by using the cell boundary resource allocated to the first cell and the available cell boundary resources of the neighboring cells.

The calculating of the cell boundary resources may include: receiving the coupling factor with respect to the first base station calculated by each neighboring base station from each neighboring base station; calculating an average value by using the calculated coupling factor with respect to the neighboring base station and the received coupling factor of each neighboring base station with respect to the first base station; and calculating available cell boundary resources of neighboring base stations, excluding a corresponding neighboring base station having a smaller calculated average value than a pre-set threshold value.

The performing may include: calculating a utility value by using an amount of data transmitted through the available cell boundary resources of the neighboring base stations during a predetermined time before a corresponding time; receiving a calculated utility value by each neighboring base station from the each neighboring base station; and when the calculated utility value is greater than the received utility value, using the available cell boundary resources of the neighboring cells at the corresponding time.

The performing may further include transmitting the calculated utility value to each neighboring base station.

The calculating of the coupling factor may include transmitting the calculated coupling factor with respect to the neighboring base station to the corresponding neighboring base station.

The cell may be divided into a cell center and a cell boundary, and the user terminal may be a terminal located in the cell boundary.

The calculating of the interference metric may include, when the value of the interference metric is greater than a pre-set threshold value, classifying the user terminal as a terminal located in the cell boundary.

The entire frequency band may be divided into a plurality of bands, and the plurality of bands may be allocated to cell boundaries between the first cell and the plurality of neighboring cells.

The calculating of the interference metric may include: receiving a reception power value of a reference signal of the first base station measured by the user terminal and a reception power value of a reception signal of the neighboring base station measured by the user terminal, from the user terminal; and calculating the interference metric by using the reception power value of the first base station and the reception power value of the reference signal of the neighboring base station.

The calculating of the coupling factor may include calculating the coupling factor with respect to each neighboring base station from the sum of the values obtained by multiplying the value of the interference metric of each user terminal greater than a pre-set threshold value and a load of the each user terminal.

Another embodiment of the present invention provides a dynamic resource allocating apparatus of a first base station that manages a first cell in a cellular communication system including the first cell and a plurality of neighboring cells adjacent to the first cell. The dynamic resource allocating apparatus may include a resource calculation unit and an allocation unit. The resource calculation unit may calculate available cell boundary resources of neighboring cells among the plurality of neighboring cells by using values of an interference metric received by a user terminal located in a cell boundary from the plurality of neighboring cells and a load of the user terminal. The allocation unit may allocate resources to the user terminal located in the cell boundary by using resources allocated to a cell boundary of the first cell and available cell boundary resources of the neighboring cells.

The dynamic resource allocating apparatus may further include a classifying unit. The classifying unit may calculate an interference metric of each user terminal indicating interference received by each user terminal belonging to the first cell from the plurality of neighboring cells, and classify a user terminal having a value of the interference metric equal to or greater than a pre-set threshold value, as a terminal located in the cell boundary.

The dynamic resource allocating apparatus may further include a reception unit. The reception unit may receive a reception power value of a reference signal of the first base station measured by the user terminal and a reception power value of a reception signal of the neighboring base station measured by the user terminal, from the user terminal. The classifying unit may calculate the interference metric by using the reception power value of the reference signal of the first base station and the reception power value of the reference signal of the neighboring base station.

The dynamic resource allocating apparatus may further include a parameter calculation unit and a reception unit. The parameter calculation unit may calculate a coupling factor between the first base station and each neighboring base station of each neighboring cell by using the interference metric of each user terminal and a load of each user terminal. The reception unit is configured to receive the coupling factor with respect to the first base station calculated by each neighboring base station, from each neighboring base station. The resource calculation unit may calculate an average value by using the calculated coupling factor with respect to the neighboring base station and the received coupling factor of each neighboring base station with respect to the first base station, and calculate available cell boundary resources of neighboring base stations from the cell boundary resources of the other remaining base stations excluding a neighboring base station having a smaller calculated average value than a pre-set threshold value among the plurality of neighboring base stations.

The resource allocation unit may calculate a utility value by using an amount of data transmitted through the available cell boundary resources of the neighboring base stations during a predetermined time before a corresponding time, and when the utility value is greater than a utility value calculated by each neighboring base station, the resource allocation unit may use the available cell boundary resources of the neighboring cells at the corresponding time.

The entire frequency band may be divided into a plurality of bands, and the plurality of bands may be allocated to cell boundaries between the first cell and the plurality of neighboring cells.

The available cell boundary resources of the neighboring base stations may include cell boundary resources not commonly used by the neighboring base stations.

BRIEF DESCRIPTION OF THE DRAWINGS

FIG. 6 is a view illustrating an example of a cell configuration for explaining a method for dynamically allocating resources according to an embodiment of the present invention.

DETAILED DESCRIPTION OF THE EMBODIMENTS

Figure 1:
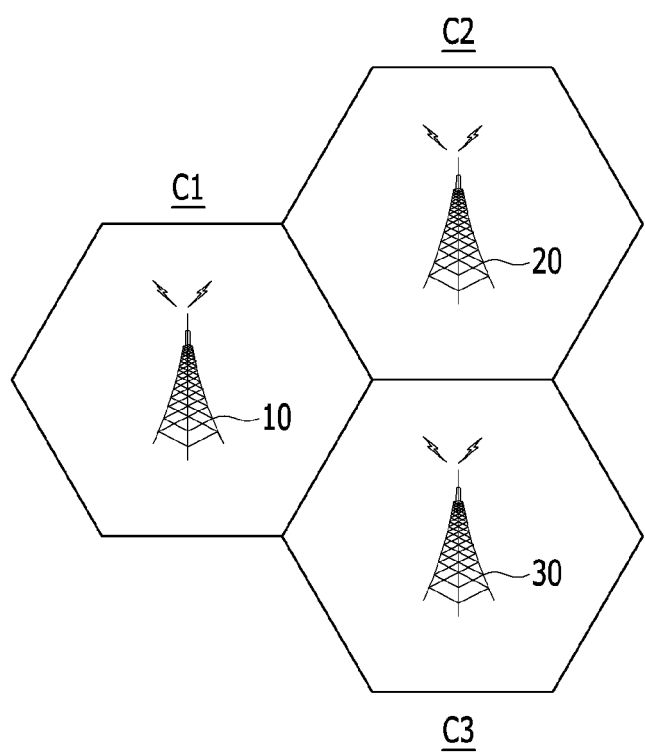
FIG. 1 is a view illustrating an example of a wireless communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Hereinafter, a method and apparatus for dynamically allocating resources according to an embodiment of the present invention will be described in detail with reference to the accompanying drawings.

Figure 2:
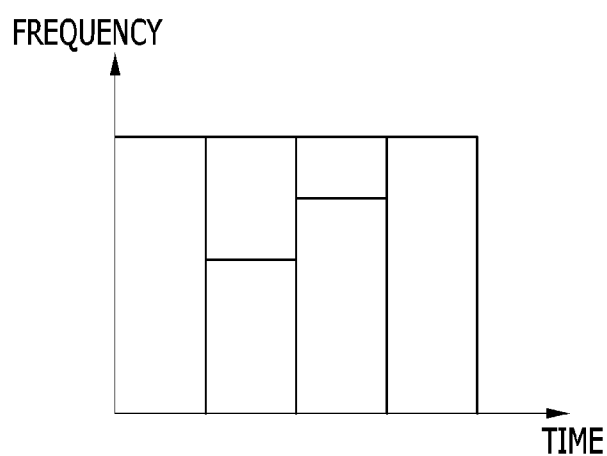
FIG. 2 is a view illustrating a radio resource structure according to an embodiment of the present invention.

FIG. 1 is a view illustrating an example of a wireless communication system according to an embodiment of the present invention, and FIG. 2 is a view illustrating a radio resource structure according to an embodiment of the present invention.

Referring to FIG. 1, a wireless communication system includes a plurality of cells C1, C2, and C3. The cells C1, C2, and C3 include base stations (BSs) 10, 20, and 30, respectively.

The BSs 10, 20, and 30 communicate with terminals with the cells C1, C2, and C3 by using radio resources, respectively.

A method for canceling inter-cell interference in a wireless communication system having the plurality of cells C1, C2, and C3 includes a fractional frequency reuse (FFR) scheme and a fractional time reuse (FTR) scheme.

Referring to FIG. 2, radio resources may be defined by two-dimensional domains of time and frequency.

The FFR scheme is a scheme of dividing a frequency domain in a radio resource structure defined by two-dimensional domains of time and frequency to allocate a frequency resource to a neighboring cell to thus cancel inter-cell interference, while the FTR scheme is a scheme of dividing a time domain to allocate a resource to a neighboring cell to thus cancel inter-cell interference.

The FFR scheme may be classified into a hard frequency reuse (HFR) scheme, a partial frequency reuse (PFR) scheme, a soft frequency reuse (SFR) scheme, and the like, based on a method of dividing bands.

Figure 3:
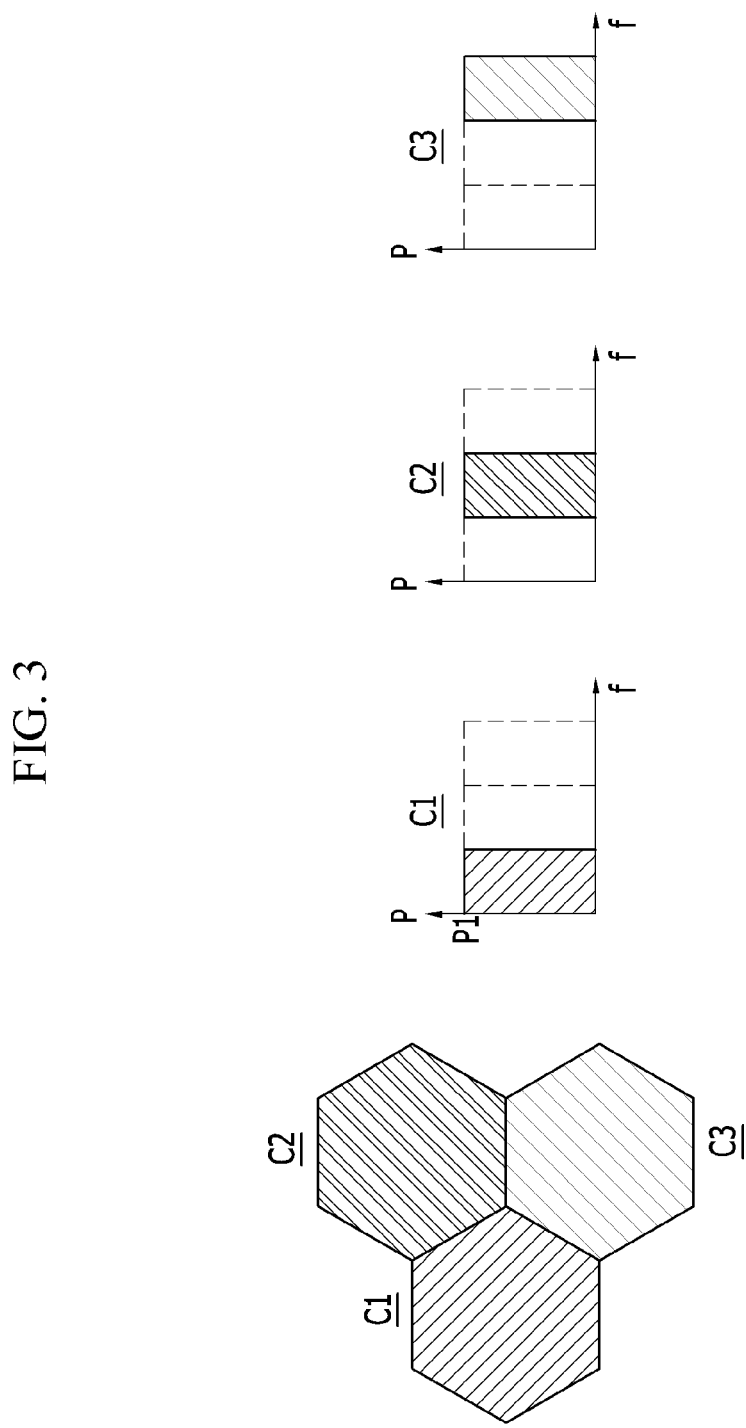
FIGS. 3 through 5 are views illustrating a hard frequency reuse (HFR) scheme, a partial frequency reuse (PFR) scheme, and a soft frequency reuse (SFR) scheme according to an embodiment of the present invention.
Figure 4:
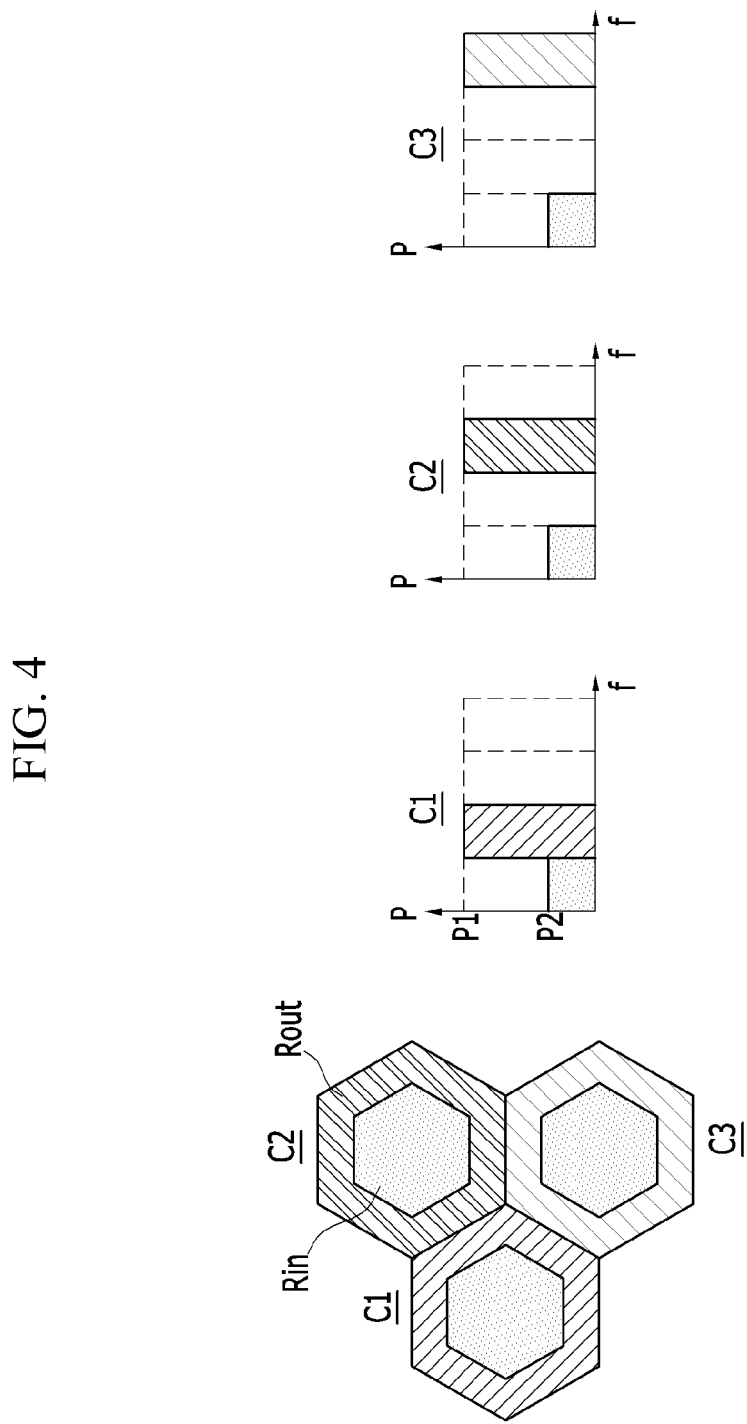
Figure 5:
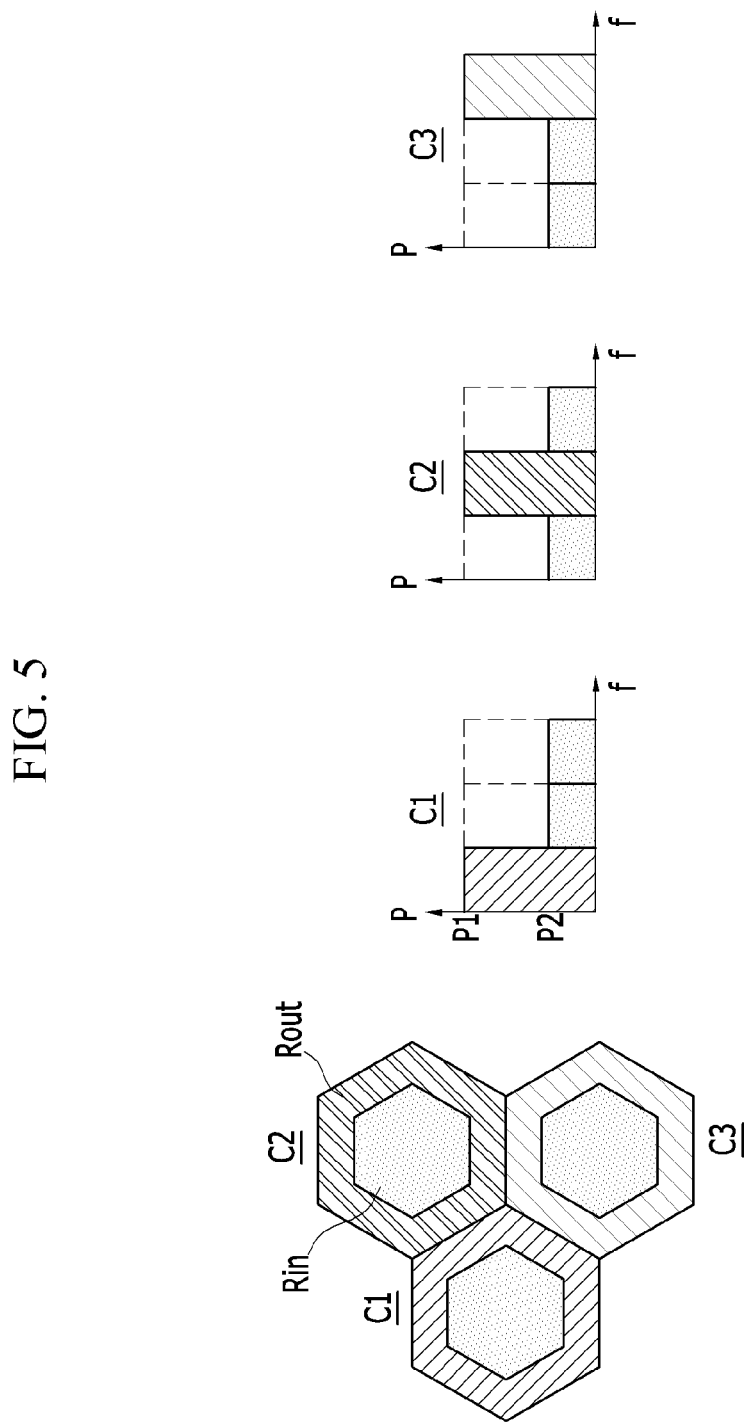

FIGS. 3 through 5 are views illustrating the HFR, PFR, and SFR schemes according to an embodiment of the present invention.

Referring to FIG. 3, the HFR scheme is a scheme of dividing the entire frequency band into three parts and the three neighboring cells C1, C2, and C3 use different bands. Here, frequency bands allocated to the boundaries of the cells C1, C2, and C3 do not overlap, not interfering with neighboring cells, so high transmission power P2 may be used. Although interference is completely removed because bands between cells do not overlap, the HFR scheme is disadvantageous in that only one-third of the entire frequency band is used in a cell, so frequency usage efficiency is degraded.

Referring to FIG. 4, the PFR scheme is a scheme of dividing the entire frequency band into four parts, and one band is allocated to the centers Rin of the respective cells C1, C2, and C3 and the other three remaining bands are allocated to the boundaries Rout of the three cells C1, C2, and C3. Here, the bands allocated to the boundaries Rout of the cells C1, C2, and C3 are exclusively allocated such that they do not overlap with each other. The frequency bands allocated to the centers Rin of the cells C1, C2, and C3 are also used in neighboring cells, so low transmission power P1 is used in order to prevent an influence of interference, while frequency bands allocated to the boundaries Rout of the cells C1, C2, and C3 do not overlap with each other and thus cause interference to neighboring cells, so high transmission power P2 is used.

Next, referring to FIG. 5, in the SFR scheme, the entire frequency band is divided into three parts like the HFR scheme, and respective bands are used in the boundaries Rout of the three cells C1, C2, and C3 and the other remaining bands not used in the boundaries Rout of the respective cells C1, C2, and C3 are commonly used in the centers Rin of the respective cells C1, C2, and C3. Here, in the SFR scheme, like the PFR scheme, the frequency bands allocated to the centers Rin of the cells C1, C2, and C3 are also used in neighboring cells, low transmission power P1 is used in order to prevent an influence of interference, and the frequency bands allocated to the boundaries Rout of the cells C1, C2, and C3 do not overlap with each other, not causing influence, and thus high transmission power P2 is used. In the SFR scheme, the bands used in the centers Rin of the cells and the bands used in the boundaries Rout of the neighboring cells overlap with each other, having a possibility of the presence of interference, but since the entire bands are all used in all the cells, resource usage efficiency is high.

Also, in the FTR scheme, various methods used in the FFR scheme may be used in the same manner.

In general, several cells may exist within a single BS, and hereinafter, a BS and a cell may be referred has having the same meaning.

FIG. 6 is a view illustrating an example of a cell configuration for explaining a method for dynamically allocating resources according to an embodiment of the present invention, in which a cell configuration according to the SFR scheme described with reference to FIG. 5 is illustrated.

Referring to FIG. 6, the entire frequency band width is given as 'B'. Cells C1 to C18 in the entire system are divided into three types of cells ($\alpha$, $\beta$, $\gamma$), and cell boundary resources (bands) may be divided into $B_\alpha$, $B_\beta$, $B_\gamma$, respectively. The cell boundary resources actually used by the respective cells C1 to C18 are denoted by $R_\alpha$, $R_\beta$, $R_\gamma$, respectively. Here, when $R_\alpha$, $R_\beta$, $R_\gamma$ is equal to or greater than $B_\alpha$, $B_\beta$, $B_\gamma$, a corresponding cell is in an overload state, and when $R_\alpha$, $R_\beta$, $R_\gamma$ is smaller than $B_\alpha$, $B_\beta$, $B_\gamma$, a corresponding cell is in an underload state. In the respective cells C1 to C18, bands other than $R_\alpha$, $R_\beta$, $R_\gamma$ are used to serve a user located in the center of each cell.

Although not shown, interference exists between neighboring BSs (cells) to support information transmission between BSs. The interference may correspond to an X2 interface in LTE.

Figure 7:
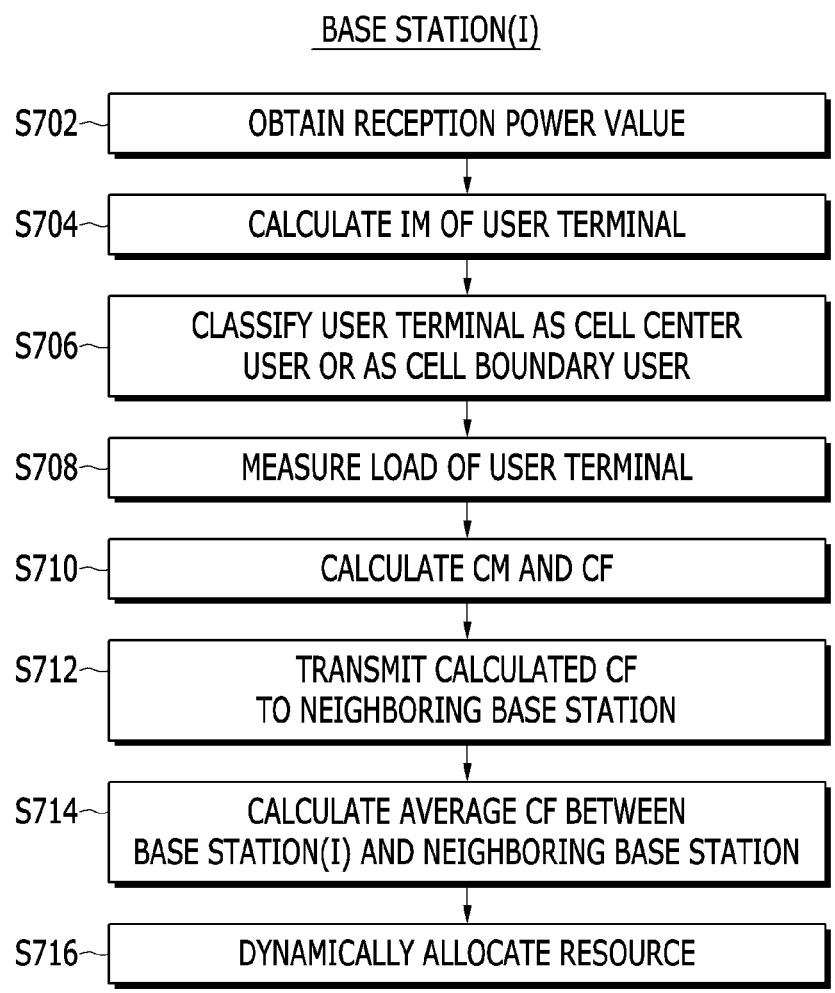
FIG. 7 is a flowchart illustrating a method for dynamically allocating resources according to an embodiment of the present invention.

FIG. 7 is a flowchart illustrating a method for dynamically allocating resources according to an embodiment of the present invention.

First, notations with respect to cells and users in the entire system are defined as shown in Table 1 below.

TABLE 1

User terminal set: $\Gamma = \{1, 2, \ldots, m, \ldots, M\}$
Base station set: $\Omega = \{1, 2, \ldots, n, \ldots, N\}$
User set belonging to base station (i):
$\Gamma_1 = \{1, 2, \ldots, m_i, \ldots, M_i\}$
Neighboring base station set of base station (i):
$\Omega_1 = \{1, 2, \ldots, n_i, \ldots, N_i\}$
User set which belongs to base station (i) and interfered by neighboring base station (j): $\Gamma_{i,j} = \{1, 2, \ldots, m_{i,j}, \ldots, M_{i,j}\}$ Referring to FIG. 7, the base station (i) transmits a reference signal to a user terminal, and the user terminal measures a reception power value of the reference signal received from the base station (i) and reports the measured reception power value to the base station (i). Here, the user terminal also measures a reception power value of a reference signal received from a neighboring base station and reports the same together with the reception power value of the reference signal received from the base station (i). Here, the reception power may include, for example, reference signal received power in case of an LTE system. Also, instead of the reception power value, a channel quality indicator (CQI) indirectly indicating channel quality such as a reception signal-to-noise ratio (SNR), a reception signal-to-interference ratio (SINR), a reception power value, and the like, may also be used.

When the reception power value of the reference signal of the base station (i) and the reception power value of the reference signal of the neighboring base station are obtained from the user terminal (S702), the base station (i) calculates an interference metric (IM) of the user terminal by using the obtained reception power value as expressed by Equation 1 shown below (S704).

$$I_{i,j}^m = \frac{P_{i,j}^{rsrp}}{P_i^{rsrp}}, m \in \Gamma_i, i \in \Omega, j \in \Omega_i \quad \text{(Equation 1)}$$

Equation 1 represents IM received by the user terminal (m) belonging to the base station (i) from a neighboring base station (j). $P_i^{rsrp}$ is a reception power value of a reference signal received by the user terminal (m) from the serving value station (i), and $P_j^{rsrp}$ is a reception power value of a reference signal received by the user terminal (m) belonging to the serving base station (i) from the neighboring base station (j).

In Equation 1, IM is decreased as the user terminal is located to be closer to the center of the cell, and is increased as the user terminal is located to be closer to the cell boundary area. Thus, the base station (i) compares IM of user terminals with a pre-set threshold value and classifies the user terminals as a user terminal located in the center of the cell (hereinafter referred to as a 'cell center user') and a user terminal located in the cell boundary (hereinafter referred to as a 'cell boundary user') (S706). Here, when IM of a user terminal is equal to or greater than the pre-set threshold value, the corresponding user terminal is classified as a cell boundary user, and when IM of a user terminal is smaller than the pre-set threshold value, the corresponding user terminal is classified as a cell center user.

Namely, a cell center user set belonging to the base station (i) may be expressed by Equation 2, and a cell boundary user set belonging to the base station (i) may be expressed by Equation 3.

$$\Gamma_i^c = \{\Gamma_i | I_{i,j}^m < IM_{th}, m \in \Gamma_i, i \in \Omega, j \in \Omega_i\} \quad \text{(Equation 2)}$$

$$\Gamma_i^e = \{\Gamma_i | I_{i,j}^m \geq IM_{th}, m \in \Gamma_i, i \in \Omega, j \in \Omega_i\} \quad \text{(Equation 3)}$$

In Equations 2 and 3, $IM_{th}$ is a pre-set threshold value.

The base station (i) may classify user groups strongly interfered by neighboring cells, among cell boundary users, as shown in Equation 4.

$$\Gamma_{i,j}^e = \{\Gamma_i^e | I_{i,j}^m \geq IM_{th}, m \in \Gamma_{i,j}\} \quad \text{(Equation 4)}$$

Thereafter, the base station (i) measures a load of a user terminal (S708). The load, a traffic rate (bits/sec) transmitted from a higher position, may be measured by a base station in case of downlink and by a terminal in case of uplink.

In an embodiment of the present invention, both a load of a downlink and that of an uplink may be considered, but in the following description, only a load of a downlink will be explained.

The base station (i) calculates a coupling metric (CM) and a coupling factor (CF) by using the IM defined as described above and a measured load (S710).

CM of the user terminal m belonging to the base station (i) with respect to a neighboring base station (j) may be calculated as expressed by Equation 5.

$$C_{i,j}^m = I_{i,j}^m L_i^m \quad \text{(Equation 5)}$$

In Equation 5, $L_i$ is the entire load (bits/sec) of the base station (i) measured in the base station (i), and $L_i^m$ is a load (bits/s) of the user terminal (m) belonging to the base station (i).

CF of the base station (i) with respect to the neighboring base station (j) is calculated as expressed by Equation 6. The base station (i) transmits the calculated CF to the neighboring base station (j) (S712). Through the foregoing process, the base station (i) may obtain CF calculated by the neighboring base station (j).

$$C_{i,j} = \sum_{m \in \Gamma_{i,j}^e} C_{i,j}^m = \sum_{m \in \Gamma_{i,j}^e} I_{i,j}^m L_i^m \quad \text{(Equation 6)}$$

Thereafter, the base station (i) calculates average CF between the base station (i) and the neighboring base station (j) (S714). Average CF between the two base stations (i and j) is calculated as expressed by Equation 7.

$$\tilde{C}_{i,j} = \frac{C_{i,j} + C_{j,i}}{2} \quad \text{(Equation 7)}$$

The base station (i) performs dynamic resource allocation by using various parameters defined above (S716).

Figure 8:
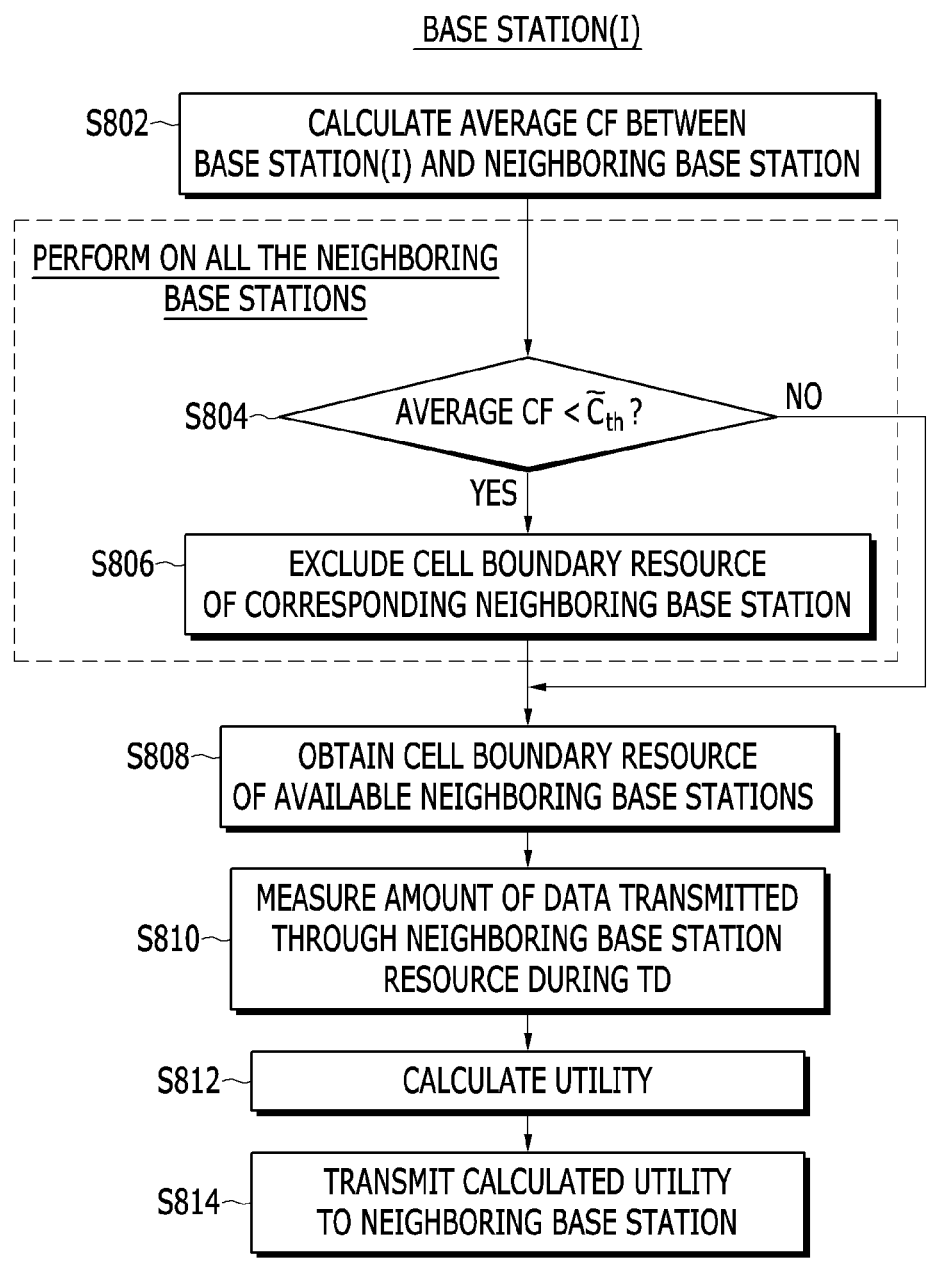
FIG. 8 is a flowchart specifically illustrating the method for dynamically allocating resources according to an embodiment of the present invention.

FIG. 8 is a flowchart specifically illustrating the method for dynamically allocating resources according to an embodiment of the present invention.

When a cell boundary resource used in the base station (i) having a cell type (x) is $R_i^x$ and a cell boundary resource not used in the base station (i) is $\overline{R}_i^x$, cell boundary resources of a neighboring cell available to be used by the base station (i) is expressed by Equation 8.

$$W_0^\alpha = \overline{R}^\beta \cup \overline{R}^\gamma \quad \text{(Equation 8)}$$

$\overline{R}^\beta$ in Equation 8, a resource of the neighboring base station having a cell type (β) and available to be used by the base station (i), may be expressed by Equation 9. Also, $\overline{R}^\gamma$, a resource of the neighboring base station having a cell type (γ) and available to be used by the base station (i), may be expressed by Equation 10.

$$\overline{R}^\beta = \overline{R}_2^\beta \cap \overline{R}_4^\beta \cap \overline{R}_6^\beta \quad \text{(Equation 9)}$$

$$\overline{R}^\gamma = \overline{R}_1^\gamma \cap \overline{R}_3^\gamma \cap \overline{R}_5^\gamma \quad \text{(Equation 10)}$$

Namely, the cell boundary resource of the neighboring base station available to be used by the base station (i) is the sum of resources not commonly used by the neighboring BS (cell) having the cell type β and resources not commonly used by the neighboring BS (cell) having the cell type γ. Thus, if any one of the neighboring cells of the base station (I) has a great load, cell boundary resources of the neighboring cells available to be used by the cell are reduced.

In order to increase the cell boundary resources of the neighboring cells available to be used by the base station (i), a scheme allowing for overlapping of a cell boundary resource of the base station (i) and that of the neighboring cell when an influence of collision (or overlap) thereof is insignificant is required. To this end, the average CF value defined as described above is used.

In Equation 8, when the CF value between the two base stations (i and j) is great, it means that the two base stations (i and j) greatly interfere with each other and performance thereof is greatly affected by the interference, and when the CF value between the two base stations (i and j) is small, it means that the two base stations (i and j) interfere with each other not significantly and performance thereof is not significantly affected by the interference, if ever.

Referring to FIG. 8, when the average CF values between the base station (i) and respective neighboring base stations are calculated (S802), the base station (i) compares the calculated average CF values between the base station (i) and the respective neighboring base stations with a pre-set threshold value ($\tilde{C}_{th}$)) (S804). When the average CF values between the base station (i) and the respective neighboring base stations are smaller than the threshold value ($\tilde{C}_{th}$), the base station (i) calculates available cell boundary resources of neighboring base stations, excluding the corresponding neighboring base stations (S806).

Figure 9:
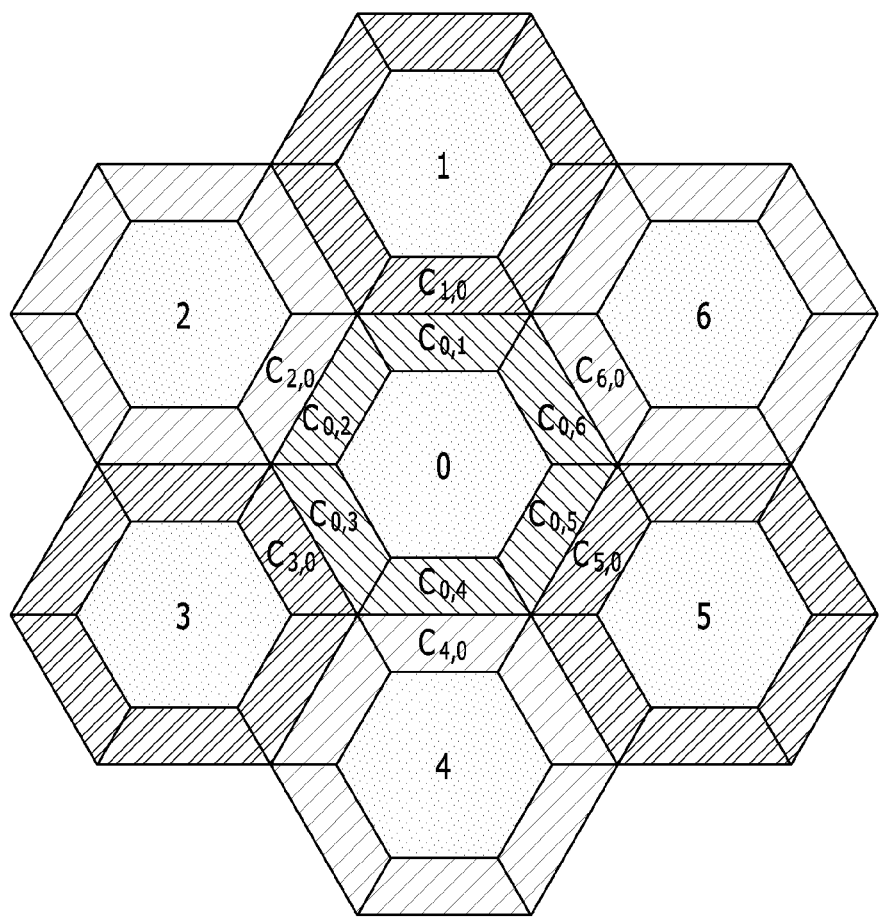
FIG. 9 is a view illustrating neighboring base stations based on a base station 0.

FIG. 9 is a view illustrating neighboring base stations based on a base station 0.

For example, as illustrated in FIG. 9, it is assumed that neighboring base stations 1, 2, 3, 4, 5, and 6 are located based on the base station 0, and a cell type of the neighboring base stations 2, 4, and 6 is β and that of the neighboring base stations 1, 3, and 5 is γ. CF values between the base station (i) with the neighboring base stations calculated by the base station (i) are $C_{0,1}$, $C_{0,2}$, $C_{0,3}$, $C_{0,4}$, $C_{0,5}$, and $C_{0,6}$, respectively, and CF values between the base station 0 and the neighboring base stations 1, 2, 3, 4, 5, and 6 received by the base station (i) from the respective neighboring base stations 1, 2, 3, 4, 5, and 6 are $C_{1,0}$, $C_{2,0}$, $C_{3,0}$, $C_{4,0}$, $C_{5,0}$, and $C_{6,0}$.

In this case, when the average CF value $$\left(\tilde{C}_{0,6} = \frac{C_{0,6} + C_{6,0}}{2}\right)$$

between the base station 0 and the neighboring base station 6 is equal to or smaller than a threshold value ($\tilde{C}_{th}$), the base station 0 excludes cell boundary resources of the neighboring base station 6 from the available cell boundary resources of the neighboring base stations 2, 4, and 6 having the cell type (β). Namely, cell boundary resources of the neighboring base stations having the cell type (β) and available to be used by the base station 0 may be expressed by $\overline{R}^\beta = \overline{R}_2^\beta \cap \overline{R}_4^\beta$.

Referring back to FIG. 8, the base station (i) performs the foregoing operations (S804 and S806) on all the neighboring base stations to obtain cell boundary resources ($W_0^\alpha = \overline{R}^\beta \cup \overline{R}^\gamma$) of the neighboring base stations available for the base station (i) (S808).

When formulated, a set of neighboring base stations having an average CF value that is equal to or smaller than the threshold value ($\tilde{C}_{th}$) among the neighboring base stations of the base station (i) may be expressed by Equation 11.

$$\Lambda_i = \{\Omega_i | \tilde{C}_{i,j} < C_{th}, j \in \Omega_i\} \quad \text{(Equation 11)}$$

Also, the base station (i) measures and manages information regarding an amount of data transmitted through the cell boundary resources of the neighboring base stations during a predetermined time (Td) in the past (S810).

The base station (i) calculates utility as expressed by Equation 12 based on the amount of data transmitted through the cell boundary resources of the neighboring base stations available for the base station (i) and the cell boundary resources of the neighboring base stations during the predetermined time (Td) in the past (S812).

$$U_i = \frac{W_i^x}{T_i} \quad \text{(Equation 12)}$$

In Equation 13, $T_i$ is the amount of data transmitted through the cell boundary resources of the neighboring base stations during the predetermined time Td in the past, and $W_i^x$ is cell boundary resources of the neighboring base stations available for the base station (i).

Namely, the base station (i) measures a required parameter value according to the foregoing procedure at every predetermined time (Td) in the past and calculates a utility value therefrom.

The base station (i) transmits all the utility values calculated thusly to all the neighboring base stations (S814). In this manner, the base station (i) obtains all the utility values with respect to the base station (i) and the neighboring base stations thereof.

Thereafter, the base station (i) determines whether to use the cell boundary resource at a corresponding time on the basis of the calculated utility value and the utility values of the neighboring base stations. Namely, a base station having the greatest utility value among the base station (i) and the neighboring base stations thereof at the corresponding time is selected as a base station to use the cell boundary resource (S816).

When the base station (i) and the neighboring base stations ($\Omega_i$) are given, and a base station ($\Lambda_i$) having an average CF value that is equal to or smaller than the threshold value ($\tilde{C}_{th}$) among the base stations is determined, the base station to use the cell boundary resource may be selected as expressed by Equation 13.

$$k^* = \max_{k \in \{i \cup (\Omega_i - \Lambda_i)\}} U_k \quad \text{(Equation 13)}$$

For example, in FIG. 9, the base station 0 compares the utility value calculated by the base station 0 and the utility values transmitted from the neighboring base stations 1, 2, 3, 4, 5, and 6, and a base station having the greatest utility value uses the cell boundary resources of neighboring base stations. Here, a maximum value may be obtained, excluding a base station having an average CF value that is equal to or smaller than the threshold value among the neighboring base stations.

Figure 10:
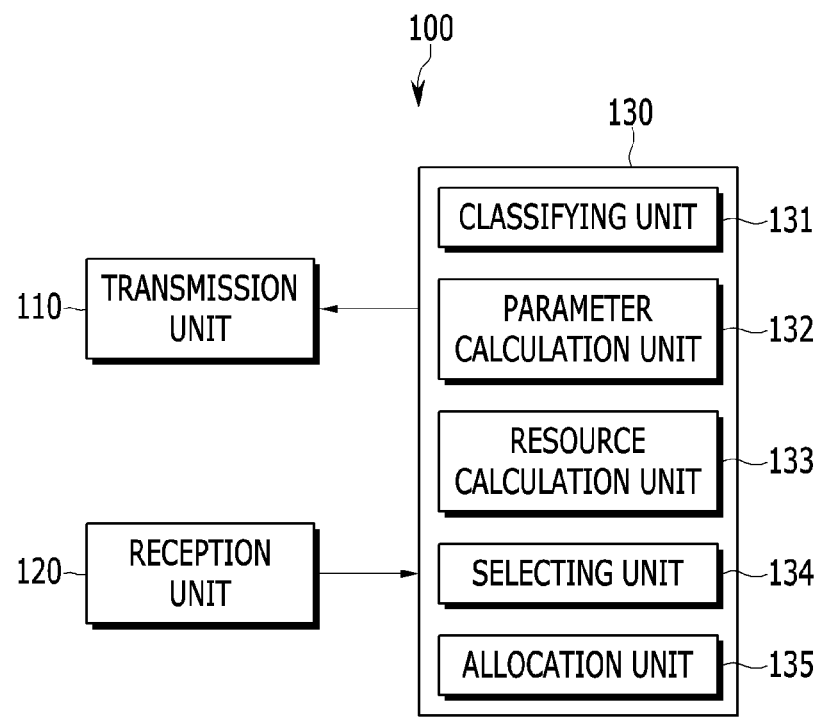
FIG. 10 is a view illustrating an apparatus for dynamically allocating resources according to an embodiment of the present invention.

FIG. 10 is a view illustrating an apparatus for dynamically allocating resources according to an embodiment of the present invention.

Referring to FIG. 10, the base station (i) includes a dynamic resource allocation apparatus 100.

The dynamic resource allocating apparatus 100 includes a transmission unit 110, a reception unit 120, and a control unit 130.

The transmission unit 110 transmits a reference signal to the user terminal. The transmission unit 110 transmits a calculated CF value between the base station (i) and a neighboring base station to the neighboring base station, and transmits a calculated utility value to the neighboring base station.

The reception unit 120 receives a reception power value of a reference signal of the base station (i) and that of a reference signal of a neighboring base station from a user terminal. The reception unit 120 receives a CF value between the neighboring base station and the base station (i) from the neighboring base station, and receives a utility value calculated by the neighboring base station from the neighboring base station.

The control unit 130 includes a classifying unit 131, a parameter calculation unit 132, a resource calculation unit 133, a selecting unit 134, and an allocating unit 135.

The classifying unit 131 calculates IM of a user terminal by using Equation 1, and classifies whether the user terminal is a cell center user or a cell boundary user by using the calculated IM.

The parameter calculation unit 132 calculates parameters required for dynamic resource allocation. The parameters required for dynamic resource allocation may include the CM, the CF between the base station (i) and the neighboring base station (j), and the average CF between the base station (i) and a neighboring base station as described above.

The resource calculation unit 133 compares the average CF values between the base station (i) and the respective neighboring base stations with a pre-set threshold value ($\tilde{C}_{th}$), and when an average CF value between the base station (i) and a neighboring base station is smaller than the threshold value ($\tilde{C}_{th}$), the resource calculation unit 133 calculates available cell boundary resources of the neighboring base stations, excluding the corresponding neighboring base station.

The selecting unit 134 calculates utility by using an amount of data transmitted through the available cell boundary resources of the neighboring base stations and the cell boundary resources of the neighboring base stations for a predetermined time (Td) in the past, and determines whether to use the cell boundary resources at a corresponding time on the basis of the calculated utility value and the utility value of the neighboring base stations. Namely, a base station having the greatest utility value among those of the base station (i) and the neighboring base stations thereof at the corresponding timing is selected as a base station to use the cell boundary resources.

When the base station (i) is selected as a base station to use the cell boundary resources, the allocation unit 135 uses the cell boundary resource allocated to the base station (i) and the available cell boundary resources of the neighboring base stations. Namely, the allocation unit 135 divides the entire frequency band into a plurality of bands, and allocates at least one of the bands to a cell boundary user in the base station (i). Here, when the base station (i) is selected as a base station to use the cell boundary resources, the allocation unit 135 may additionally allocate the available cell boundary resources of the neighboring base stations to the cell boundary user.

According to embodiments of the present invention, since inter-cell resource allocation is adaptively performed in consideration of a user distribution and a change in a load level, resource usage efficiency can be enhanced while canceling inter-cell interference.

Also, since resources to be used by a corresponding cell are determined only through a procedure in which one cell exchanges information with a neighboring cell, a centralized server is not required.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating resources by a dynamic resource allocating apparatus of a first base station that manages a first cell in a cellular communication system including the first cell and a plurality of neighboring cells adjacent to the first cell, the method comprising:
   calculating an interference metric of each user terminal belonging to the first cell that is interfered by one of the plurality of neighboring cells;
   calculating a coupling factor between the first base station and each neighboring base station of each neighboring cell by using the interference metric of each user terminal and a load of each user terminal;
   receiving a coupling factor with respect to the first base station calculated by said each neighboring base station from said each neighboring base station;
   calculating an average value between the first base station and said each neighboring base station by using the calculated coupling factor with respect to said each neighboring base station and the received coupling factor of said each neighboring base station with respect to the first base station; and
   calculating available cell boundary resources of neighboring base stations, excluding a corresponding neighboring base station having a smaller calculated average value than a pre-set threshold value; and
   performing resource allocation by using cell boundary resources allocated to the first cell and the available cell boundary resources of the neighboring cells.

2. The method of claim 1, wherein the available cell boundary resources of the neighboring cells include cell boundary resources not commonly used by the plurality of neighboring base stations.

3. The method of claim 1, wherein the performing comprises:
   calculating a utility value by using an amount of data transmitted through the available cell boundary resources of the neighboring base stations during a predetermined time before a corresponding time;
   receiving a calculated utility value by each neighboring base station from the each neighboring base station; and
   when the calculated utility value is greater than the received utility value, using the available cell boundary resources of the neighboring cells at the corresponding time.

4. The method of claim 3, wherein the performing further comprises
   transmitting the calculated utility value to each neighboring base station.

5. The method of claim 1, wherein the calculating of the coupling factor comprises
   transmitting the calculated coupling factor with respect to the neighboring base station to the corresponding neighboring base station.

6. The method of claim 1, wherein the cell is divided into a cell center and a cell boundary, and
   the user terminal is a terminal located in the cell boundary.

7. The method of claim 6, wherein the calculating of the interference metric comprises,
   when the value of the interference metric is greater than a pre-set threshold value, classifying the user terminal as a terminal located in the cell boundary.

8. The method of claim 6, wherein the entire frequency band is divided into a plurality of bands, and the plurality of bands are allocated to cell boundaries between the first cell and the plurality of neighboring cells.

9. The method of claim 1, wherein the calculating of the interference metric comprises:
   receiving a reception power value of a reference signal of the first base station measured by the user terminal and a reception power value of a reception signal of the neighboring base station measured by the user terminal, from the user terminal; and
   calculating the interference metric by using the reception power value of the first base station and the reception power value of the reference signal of the neighboring base station.

10. The method of claim 1, wherein the calculating of the coupling factor comprises
    calculating the coupling factor with respect to each neighboring base station from the sum of the values obtained by multiplying the value of the interference metric of each user terminal greater than a pre-set threshold value and a load of the each user terminal.

11. A dynamic resource allocating apparatus of a first base station that manages a first cell in a cellular communication system including the first cell and a plurality of neighboring cells adjacent to the first cell, the apparatus comprising:
a parameter calculation unit configured to calculate a coupling factor between the first base station and each neighboring base station of each neighboring cell by using values of an interference metric of each user terminal, received by said each user terminal located in a cell boundary from the plurality of neighboring cells, and a load of said each user terminal;
a reception unit configured to receive a coupling factor with respect to the first base station calculated by said each neighboring base station, from said each neighboring base station,
a resource calculation unit configured to
calculate an average value between the first base station and said each neighboring base station by using the calculated coupling factor with respect to said each neighboring base station and the received coupling factor of said each neighboring base station with respect to the first base station, and
calculate available cell boundary resources of neighboring base stations, excluding a corresponding neighboring base station having a smaller calculated average value than a pre-set threshold value; and
an allocation unit configured to allocate resources to the user terminal located in the cell boundary by using resources allocated to a cell boundary of the first cell and available cell boundary resources of the neighboring cells.

12. The apparatus of claim 11, further comprising
a classifying unit configured to calculate an interference metric of each user terminal indicating interference received by each user terminal belonging to the first cell from the plurality of neighboring cells, and classify a user terminal having a value of the interference metric equal to or greater than a pre-set threshold value, as a terminal located in the cell boundary.

13. The apparatus of claim 12, further comprising
a reception unit configured to receive a reception power value of a reference signal of the first base station measured by the user terminal and a reception power value of a reception signal of the neighboring base station measured by the user terminal, from the user terminal,
wherein the classifying unit calculates the interference metric by using the reception power value of the reference signal of the first base station and the reception power value of the reference signal of the neighboring base station.

14. The apparatus of claim 11, wherein the resource allocation unit calculates a utility value by using an amount of data transmitted through the available cell boundary resources of the neighboring base stations during a predetermined time before a corresponding time, and when the utility value is greater than a utility value calculated by each neighboring base station, the resource allocation unit uses the available cell boundary resources of the neighboring cells at the corresponding time.

15. The apparatus of claim 14, further comprising:
a reception unit configured to receive a utility value calculated by each neighboring base station from each neighboring base station; and
a transmission unit configured to transmit the calculated utility value to each neighboring base station.

16. The apparatus of claim 14, wherein the entire frequency band is divided into a plurality of bands, and the plurality of bands are allocated to cell boundaries between the first cell and the plurality of neighboring cells.

17. The apparatus of claim 11, wherein the available cell boundary resources of the neighboring base stations include cell boundary resources not commonly used by the neighboring base stations.

* * * * *

UNITED STATES PATENT AND TRADEMARK OFFICE
CERTIFICATE OF CORRECTION

| | | |
|---|---|---|
| PATENT NO. | : 9,112,670 B2 | Page 1 of 1 |
| APPLICATION NO. | : 14/086571 | |
| DATED | : August 18, 2015 | |
| INVENTOR(S) | : Jae Su Song et al. | |

It is certified that error appears in the above-identified patent and that said Letters Patent is hereby corrected as shown below:

On the title page: add

Item (30) Foreign Application Priority Data "(KR) 10-2012-0143861"

Signed and Sealed this
Sixteenth Day of February, 2016

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 9,112,670 B2 |
| APPLICATION NO. | : 14/086571 |
| DATED | : August 18, 2015 |
| INVENTOR(S) | : Jae Su Song et al. |

It is certified that error appears in the above-identified patent and that said Letters Patent is hereby corrected as shown below:

This certificate supersedes the Certificate of Correction issued February 16, 2016. The certificate is vacated since petition to accept an unintentionally delayed priority claim under 35 U.S.C. § 120 hasn't been approved by the Office of Petitions. The Certificate of Correction was published in error and should not have been issued for this patent.

Signed and Sealed this
Twelfth Day of July, 2016

Michelle K. Lee
*Director of the United States Patent and Trademark Office*